US008643596B2

(12) United States Patent
Bay et al.

(10) Patent No.: US 8,643,596 B2
(45) Date of Patent: Feb. 4, 2014

(54) CONTROL OF A SCROLLABLE CONTEXT MENU

(75) Inventors: Susanne Bay, Erlangen (DE);
Christoph Braun, Rosenheim (DE);
Hanna Köhler, Bergisch Gladbach (DE)

(73) Assignee: Siemens Aktiengesellschaft, Munich (DE)

( * ) Notice: Subject to any disclaimer, the term of this patent is extended or adjusted under 35 U.S.C. 154(b) by 1077 days.

(21) Appl. No.: 12/232,249

(22) Filed: Sep. 12, 2008

(65) Prior Publication Data

US 2009/0073114 A1 Mar. 19, 2009

(30) Foreign Application Priority Data

Sep. 13, 2007 (DE) .......................... 10 2007 043 658

(51) Int. Cl.
*G09G 5/00* (2006.01)
(52) U.S. Cl.
USPC .......................................... 345/156; 715/700
(58) Field of Classification Search
USPC .................................................. 345/156–172
See application file for complete search history.

(56) References Cited

U.S. PATENT DOCUMENTS

| 6,124,855 | A | * | 9/2000 | Sells | 715/866 |
| 7,590,413 | B2 | * | 9/2009 | May | 455/414.1 |
| 7,602,382 | B2 | * | 10/2009 | Hinckley et al. | 345/173 |

* cited by examiner

*Primary Examiner* — Kevin M Nguyen
*Assistant Examiner* — Kenneth B Lee, Jr.
(74) *Attorney, Agent, or Firm* — Harness, Dickey & Pierce, P.L.C.

(57) ABSTRACT

Disclosed are a method, a system and a navigation device for generating and controlling an interaction object, which is preferably in the form of a context menu, on a display unit. In at least one embodiment, the method includes presentation of the interaction object by way of at least one presentation signal from the navigation device and selection of at least one functional element from the presented interaction object by way of at least one selection signal from the navigation device, wherein the selection can be made independently of a movement by the navigation device and wherein the at least one functional element to be selected and/or the selected at least one functional element is presented at a constant location on the display unit by moving within the interaction object or by moving the interaction object.

15 Claims, 5 Drawing Sheets

CONTROL OF A SCROLLABLE CONTEXT MENU

PRIORITY STATEMENT

The present application hereby claims priority under 35 U.S.C. §119 on German patent application number DE 10 2007 043 658.2 filed Sep. 13, 2007, the entire contents of which is hereby incorporated herein by reference.

FIELD

Embodiments of the present invention generally relate to a computer-based method, a product and/or a system for generating and controlling a movable dynamic interaction object with interactively movable and controllable functional elements. In at least one embodiment, the selection of a functional element from the functional elements and the presentation are optimized. In this case, the interaction object and the functional elements are displayed as a context menu with buttons (options) on a graphical user interface. The operator control elements on a navigation device, such as a computer mouse having two keys and a scrollwheel, are used to call or select and activate the functional elements.

BACKGROUND

By now, many of today's electronic data processing installations, such as personal computers, laptops etc., have operating systems with graphical user interfaces. Such installations can therefore be operated easily and intuitively using pointing appliances, for example.

Modern applications running on such graphically oriented operating systems use what is known as windows technology to communicate with a user. In this case, the applications or executed programs are presented in one or more virtual windows and their results are likewise displayed. Examples of typical applications of this kind are office applications (word processing programs, presentation programs, database programs, spreadsheet programs, etc.) and graphics applications (image editing programs, animation programs, design and calculation programs, etc.).

In this case, a user interacts with tools from such applications, for example programs for image editing, frequently on an event-controlled basis using toolbars, pallets, task panes, control areas, menus, context menus, popup windows, dialog boxes, etc. Frequently, the tools of the applications, which are included in the objects cited above by way of example and are presented accordingly, are selected, activated and controlled by way of a pointing appliance, such as a computer mouse.

However, particularly in the case of graphics applications, such as image editing programs, the operation and control of such objects for activating tools still have shortcomings in terms of their presentation and use.

Particularly in the medical field, a radiologist analyzing digital medical images on a personal computer (PC) needs to concentrate and focus on the content of the images. To this end, the radiologist uses an appropriate piece of software for image editing. So as now to be able to analyze the medical images, the image editing software provides various accessories and tools (e.g. measure tissue density, measure distances, mark lesion, etc.).

However, since image editing programs in the prior art, and the other previously known graphics applications, involve tools and accessories being selected and activated using menus which are not movable or mobile, this frequently also necessitates moving a pointing appliance in order to select and activate the respective buttons on the tools and accessories. In this case, moving the pointing appliance is counter productive, because it leads away from the location of the actual application target.

The result of such a practice for the instance of the analysis of medical images by the radiologist is that the radiologist needs to turn his attention away from the medical image toward the menus and buttons. This makes the analysis very inefficient, since the radiologist loses the context for the image and needs to spend a lot of time on the change of context 'medical image—tool selection'. For the selection of appropriate tools and accessories, as little distraction as possible would therefore be very desirable in order to allow the most efficient and fastest analysis of images possible in such a case.

Similar circumstances and aspects also arise for other types of applications which interact with a user on a graphical user interface.

As already mentioned, almost all current programs or applications which are presented on graphical user interfaces have a context menu which can be activated by clicking on the right-hand key on a computer mouse. Such a menu always needs to be operated and controlled by moving the mouse, i.e. the mouse pointer, inter alia. In addition, there is no option for the user to configure the context menu. Another, important aspect in terms of user friendliness is that the menus with their buttons have not been able to be activated using a depressible scrollwheel on a computer mouse (by rotating and pressing the scrollwheel), to date. In the case of the solution according to the invention, this additional functionality is included as an option, however. The overall result is that of simplified operation and control of the applications.

SUMMARY

In at least one embodiment of the present invention, a way of optimizing, improving and simplifying a presentation and selection process are demonstrated for tools and accessories from computer-aided applications on a user interface which requires fewer user actions.

In at least one embodiment of the invention, a navigation device is provided for the operation of the method according to at least one embodiment of the invention.

At least one embodiment of the invention provides a method for generating and controlling at least one interaction object. The interaction object can be presented and moved on a display unit and comprises at least one functional element for controlling tools. The at least one functional element can be selected and/or activated by means of at least one control signal, particularly a selection signal, from at least one operator control element on a navigation device. The navigation device is presented on the display unit by at least one movable navigation symbol. The method according to at least one embodiment of the invention comprises, inter alia:

Presentation of the interaction object by means of at least one presentation signal; in this case, the presentation signal can be produced by an electronic data processing installation and/or by the navigation device. The navigation device may be connected to the electronic data processing installation. In addition, the method according to the invention comprises:

Selection of the at least one functional element from the presented interaction object by means of the selection signal; the at least one functional element can be selected independently of a movement by the navigation symbol. The functional element to be selected is presented on the display unit at a constant location by moving within the interaction object or by moving the interaction object. It is also possible for the tool not to be activated or started automatically. In that case, the selected functional element can be presented on the display unit in addition or as an alternative.

This provides a first mode of operation of the interaction object, according to which the navigation symbol can be moved following the activation and presentation of the interaction object. However, the functional element to be selected or the selected functional element is always presented at one position on the display unit, i.e. at a constant location.

Another mode of operation involves the navigation symbol being held during the process of selecting and activating the functional elements.

The interaction objects may be an interactive control element. By way of example, the interaction object may be a context menu which can be presented on the display unit upon execution of a piece of image editing software or of an image editing program for the purpose of processing medical images. The functional elements are clickable, i.e. activatable, buttons which each have different computer-based accessories, applications and tools associated with them, particularly for image editing. By way of example, the display unit may be a screen, LCD display, projector, etc. The at least one navigation device may be a movable pointing appliance in the form of a computer mouse. As operator control elements, the computer mouse may have two depressible keys and a depressible and rotatable scrollwheel. Alternatively, the navigation device may also represent a pointing appliance which remains fixed at one location in the form of a trackball, for example integrated in a keyboard. The at least one navigation symbol which represents the at least one navigation device on the display unit can be presented as an upwardly pointing arrow.

In the application instance of medical image editing, the interaction object is then activated by way of activation, e.g. by pressing the right-hand key on a computer mouse and by producing an activation signal, and is presented as a context menu using presentation signals. The context menu then uses a plurality of functional elements, which are presented as what are known as buttons or switching symbols, to provide the user with access to different image editing tools, such as "measure distances", "measure tissue density", "mark lesion", etc. In this case, the presentation of the buttons may be in table or column fashion. This involves the respective buttons being presented in rows beneath one another.

The context menu presented is therefore square in shape, in particular. When the context menu is activated and presented, a particular button can be selected and marked (presented in highlight using a "highlight function"). A user of the image editing software can then rotate a scrollwheel on the computer mouse forward (producing selection signals) to prompt the context menu to be presented such that it moves, almost at the same time as the scrollwheel is rotated, accordingly upward, i.e. toward the top edge of the window in which the application is running on the display unit. Rotating the scrollwheel downward therefore prompts the converse presentation, i.e. movement of the context menu downward.

In line with at least one embodiment of the invention, selection of a desired button or tool that involves the respectively or currently selected button, which is presented in marked form, always remaining at a position whose location is constant on the display unit. In other words, the context menu presented is moved dynamically up and down such that the button to be selected and/or the selected button is presented at a constant location on the monitor. Alternatively, the context menu can be presented statically and only the button to be selected or the selected button changes in line with the operation of the scrollwheel, for example on the computer mouse. Such presentation of the buttons during the selection and/or activation process is similar to the display thereof on an electricity meter.

This now makes it easier for the user no longer to have to turn his attention completely from the medical image. The work context is preserved and the process becomes significantly more efficient.

In line with a second aspect of the present invention, the method according to at least one embodiment of the invention may also comprise:
activation of the interaction object prior to the presentation of the interaction object and/or prior to the selection of the at least one functional element, wherein the activation is performed automatically or by way of an activation signal from the operator control element on the navigation device.

The effect of activating the interaction object is therefore that it is displayed or presented as a context menu on the display unit. By way of example, the context menu can be activated automatically when the user moves, i.e. displaces, the mouse such that the mouse pointer moves on the display unit accordingly and where the mouse pointer has reached a specific area of the displayed image.

Alternatively, the context menu can be activated by pressing an appropriate key on a computer mouse. In another aspect of at least one embodiment of the present invention, the interaction object is activated using a depressible scrollwheel. In this case, even more convenient operation and control of an application is possible.

In a third aspect of at least one embodiment of the present invention, the selection signal may be identical to the activation signal or one signal may comprise the other signal. This allows rapid actuation and presentation of the interaction object as a context menu, for example.

In line with a fourth aspect of at least one embodiment of the present invention, at least during the selection the functional element to be selected and/or the selected functional element is presented in a position on the display unit which is at a constant location relative to the position of the navigation symbol when the interaction object is activated. In other words, the context menu's displayed or presented button which is currently selected and marked is presented at a constant location at a point on the display unit which is constant relative to the position at which there was a mouse pointer when the context menu was activated by pressing a key on a computer mouse. The effect which can be achieved by this is that the menu's relevant button area is at the point at which the pointing appliance was located and was intuitively operated in order to initiate an action, i.e. a tool and/or accessory in the application. A similar thing, i.e. what has been described above, can naturally also take place during the activation of the functional element.

In line with a fifth aspect of at least one embodiment of the present invention the method also comprises:
Deactivation of the interaction object by means of at least one deactivation signal. This may result in the interaction object presented as a context menu being hidden. The deactivation signal can be produced by pressing an operator control element on a mobile pointing appliance, e.g. a computer mouse key, or by pressing a key on a static data input device, such as a keyboard (e.g. ESC key). This provides a simple way of cancelling or terminating the context menu without any execution of tools and accessories.

In line with a sixth aspect, the solution according to at least one embodiment of the invention comprises:

Deactivation of the interaction object following the selection or following activation of the functional element. By way of example, this ensures that the context menu is automatically hidden as soon as a button has been selected and activated by a user. The context menu is therefore displayed only for as long as necessary.

In line with a seventh aspect of the solution according to at least one embodiment of the invention, at least one subregion of the interaction object can have the functional element configured in context-sensitive and/or dynamic fashion. In respect of the configurability, a user himself can define which functional elements, i.e. buttons, are presented in the context menu in each case, i.e. for each work session. This means that it is possible to configure various buttons or switching symbols which activate tools in an application which a user uses most frequently. Such a region of the context menu can always remain constant, i.e. the presentation or sequence of the buttons is not altered during selection. The most frequently used tools can always be displayed in the upper region of the context menu, for example, while the lower region is reserved for other tools or for the rest of the tools. Such a configuration option for the interaction object provides a certain logic for the selection of the functional elements.

By way of example, the last functional element or tool used can always be presented so as to be preset as selected within the interaction object. In such a case, the position of the tools is also easier for the user to learn or more memorable, since he himself can create it. This results in increased efficiency in the operation of the respective application. A second presented region of the context menu can change in respect of the displayed buttons for the individual tools and accessories before work with program begins, or can vary automatically according to the selected operating mode of the respective program. Only the tools which are relevant to the respectively detected context are presented with their functional elements. The context menu therefore comprises a static region with firmly prescribed or predefinable buttons and a dynamic region, with variable or varying buttons which change or can change according to the context of use. The variable range is thus based on a detected use profile for the user. The buttons which the user has selected most frequently can be presented at the uppermost point.

In accordance with an eighth concept of at least one embodiment of the invention, presentation of the interaction object involves the functional element being presented on the basis of its use and/or the tools. As already mentioned, it is possible in this case to present the buttons of the context menu on the basis of the number of times associated tools are used, on the basis of their significance or on the basis of their complexity, i.e. their influence on other tools and accessories.

In line with a ninth aspect of at least one embodiment of the present invention, the interaction object is presented in non-obscuring fashion relative a presented background on the display unit. In other words, the buttons which form the links to the tools of the application have a certain degree of transparency in respect of the background displayed behind the interaction object. When a medical image is being edited, the user does not need to turn his attention completely to the context menu, for example, which contributes to the user maintaining focus. The image displayed "underneath" is therefore not obscured completely and continues to be visible to a certain degree.

In line with a tenth aspect of at least one embodiment of the present invention, the navigation symbol, for example a mouse pointer, in the form of an arrow and representing the computer mouse, is presented following activation of the interaction object in a position whose location is constant on the display unit. The effect achieved by this, by way of example, is that upon or following the activation and presentation of the interaction object it is possible for a pointing appliance or a navigation device, such as a computer mouse, to be moved as desired. However, the user is always focused on the button to be selected, because the position of the navigation symbol on the display unit is held or locked. This provides a further mode of use, according to which, in comparison with the first mode of use, the navigation symbol is presented in a position whose location is constant on the display unit during the process of selecting and activating the functional elements of the interaction object. Moving the navigation device therefore has no influence on the movement of the navigation symbol until a functional element has been selected and activated.

In an eleventh concept of the solution according to at least one embodiment of the invention, the functional element comprises a symbol-like functional element and/or a textual functional element. An interaction object presented as a context menu may accordingly contain buttons in the form of symbols (icons) and/or text. Equally, a symbol may be linked to a piece of text to form a button, the effect of which is simpler and faster recognition of a specific menu entry, i.e. a particular button.

In line with a twelfth aspect of the present invention, the navigation device is in the form of a mobile pointing appliance for the purpose of carrying out the method according to at least one embodiment of the invention. As already mentioned, this may be a computer mouse with three operator control elements, i.e. two keys and a rotatable and depressible jog dial or scrollwheel, for example. This allows simple selection and activation of the buttons to be implemented.

Another embodiment is directed to a navigation device having at least one operator control element and at least one selection and activation module for carrying out the method of at least one embodiment described above.

Another embodiment is directed to a system for carrying out the method according to at least one embodiment of the invention. Besides a display unit, the system comprises a navigation device having an operator control element for producing an activation signal and/or a presentation signal and/or a selection signal and/or a deactivation signal and/or at least one navigation signal. As already described, the navigation device may be a computer mouse with appropriate operator control elements, for example. In addition, the system comprises an electronic data processing device having a hardware module for processing signals described above and for carrying out the method according to at least one embodiment of the invention described above or its further embodiments. The aforementioned aspects, features and alternative embodiments which have been mentioned in connection with the description of the method according to at least one embodiment of the invention can also be applied to the system according to at least one embodiment of the invention as appropriate.

The embodiments of the method according to the invention which have been described above may also be in the form of a computer program product, wherein a computer is prompted to carry out the method according to at least one embodiment of the invention described above and the program code thereof is executed by a processor. In at least one other embodiment, a storage medium is intended for storing the computer-implemented method described above and can be read by a computer.

In addition, it is possible for individual components of at least one embodiment of the method described above to be able to be executed in one saleable unit and for the remaining components to be able to be executed in another saleable unit—as a distributed system, so to speak.

The disclosed features of the method according to at least one embodiment of the invention can self evidently be combined with one another in any way, as far as this makes technical sense, to obtain further characteristics.

BRIEF DESCRIPTION OF THE DRAWINGS

The detailed description of the figures below discusses and provides a more detailed explanation of examples of embodiments of the invention, which are to be understood as non-limiting, with their features and further advantages with reference to the drawings, in which.

DETAILED DESCRIPTION OF THE EXAMPLE EMBODIMENTS

Various example embodiments will now be described more fully with reference to the accompanying drawings in which only some example embodiments are shown. Specific structural and functional details disclosed herein are merely representative for purposes of describing example embodiments. The present invention, however, may be embodied in many alternate forms and should not be construed as limited to only the example embodiments set forth herein.

Accordingly, while example embodiments of the invention are capable of various modifications and alternative forms, embodiments thereof are shown by way of example in the drawings and will herein be described in detail. It should be understood, however, that there is no intent to limit example embodiments of the present invention to the particular forms disclosed. On the contrary, example embodiments are to cover all modifications, equivalents, and alternatives falling within the scope of the invention. Like numbers refer to like elements throughout the description of the figures.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments of the present invention. As used herein, the term "and/or," includes any and all combinations of one or more of the associated listed items.

It will be understood that when an element is referred to as being "connected," or "coupled," to another element, it can be directly connected or coupled to the other element or intervening elements may be present. In contrast, when an element is referred to as being "directly connected," or "directly coupled," to another element, there are no intervening elements present. Other words used to describe the relationship between elements should be interpreted in a like fashion (e.g., "between," versus "directly between," "adjacent," versus "directly adjacent," etc.).

The terminology used herein is for the purpose of describing particular embodiments only and is not intended to be limiting of example embodiments of the invention. As used herein, the singular forms "a," "an," and "the," are intended to include the plural forms as well, unless the context clearly indicates otherwise. As used herein, the terms "and/or" and "at least one of" include any and all combinations of one or more of the associated listed items. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Spatially relative terms, such as "beneath", "below", "lower", "above", "upper", and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, term such as "below" can encompass both an orientation of above and below. The device may be otherwise oriented (rotated 90 degrees or at other orientations) and the spatially relative descriptors used herein are interpreted accordingly.

Although the terms first, second, etc. may be used herein to describe various elements, components, regions, layers and/or sections, it should be understood that these elements, components, regions, layers and/or sections should not be limited by these terms. These terms are used only to distinguish one element, component, region, layer, or section from another region, layer, or section. Thus, a first element, component, region, layer, or section discussed below could be termed a second element, component, region, layer, or section without departing from the teachings of the present invention.

Figure 1:
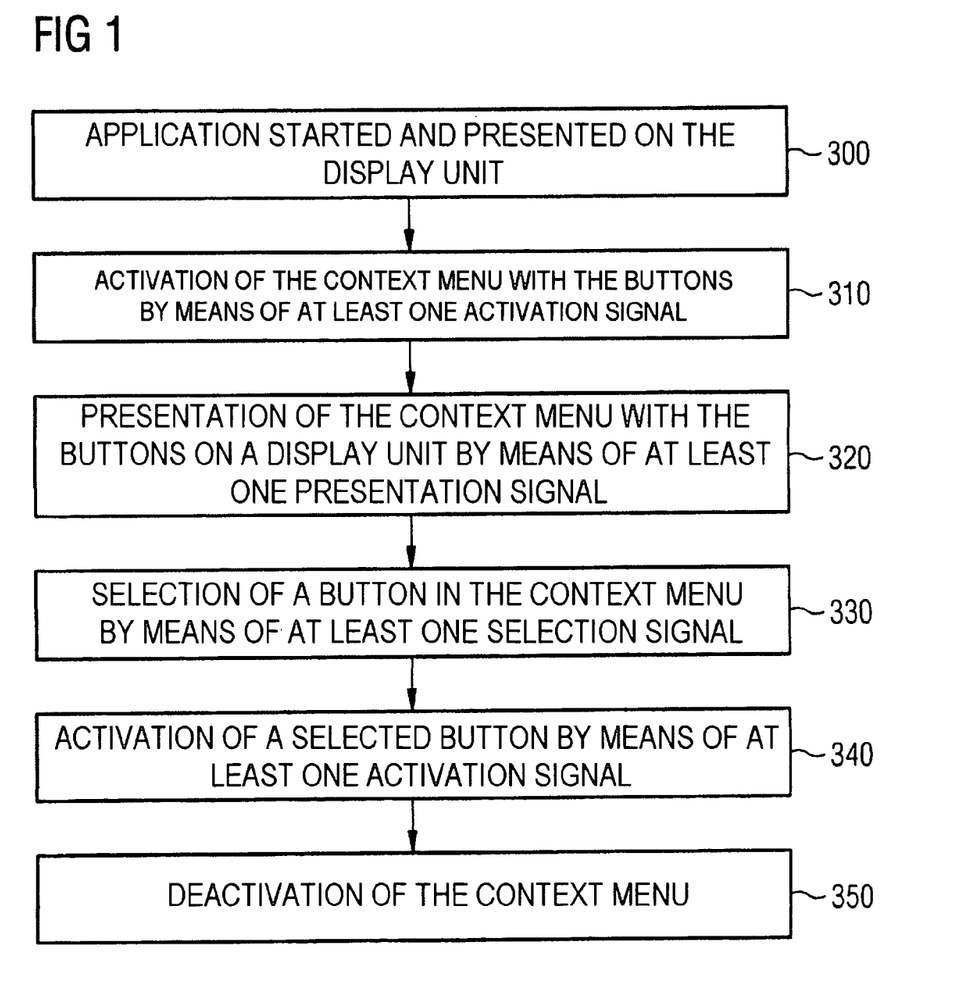
FIG. 1 shows a diagram of an example flow of the method based on an embodiment of the present invention.

FIG. 1 shows a flowchart of an example flow of the computer-based method according to an embodiment of the invention. It describes the flow of the method for generating and controlling an interaction object 1 with reference to an analysis process for a medical image B presented in outline on a display unit 10 (see FIG. 3). The dynamic interaction object 1, presented as a mobile context menu 1 within the context of the method, and the medical image B are shown in FIGS. 2a to 2e.

The method can be carried out by way of an electronic data processing installation 20 (see FIG. 3) to which at least one pointing appliance according to an embodiment of the invention or a navigation device 11 according to an embodiment of the invention is connected. An electronic data processing installation 20 of this kind is not described in detail below, since its components and technology are known previously. Only fundamental components and modules, particularly those in the navigation device 11 according to an embodiment of the invention (see FIG. 3), are presented and explained in more detail in the course of the description of the system 100 according to an embodiment of the invention.

After the relevant image processing program, which can be used to operate the method according to an embodiment of the invention using an appropriate navigation device 11 according to an embodiment of the invention, has been started at 300 and an image file has been opened, the information contained therein is presented graphically as a medical image B on the display of a display unit 10 (see FIGS. 2a to 2e, 3) by way of the electronic data processing device 20.

Figure 2A:
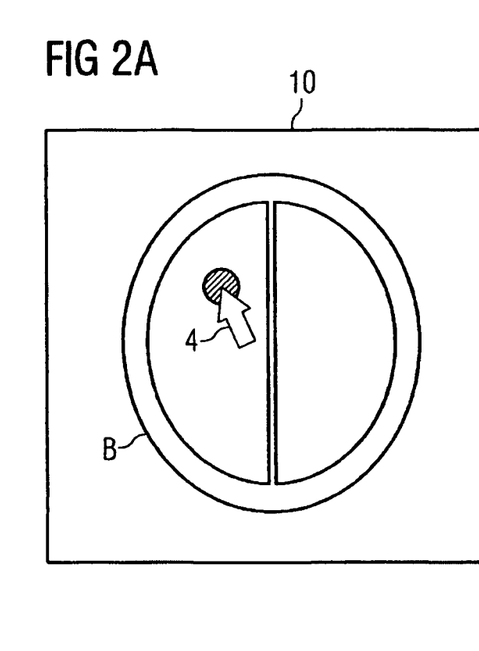
FIGS. 2a to 2e show activation and presentation of a context menu with buttons on a display unit during the selection of a button in the course of analysis of a medical image in line with the flowchart shown in FIG. 1.

In FIG. 2a, besides the medical image B presented in outline, the display unit 10 presents a navigation symbol 4 in the form of a white arrow (with a black border) 4. In this case, the white arrow 4 represents the position or the movement of a navigation device 11 connected to the electronic data processing device 20, or of a pointing appliance 11. In other words, the user of the image editing program can move the pointing appliance 11 to alter the presented position of the white arrow 14 on the display unit 10. The pointing appliance 11 will be described in more detail in the further course of the text.

As part of the analysis process for the medical image B, the user now moves the pointing appliance 11 or the white arrow 4 intuitively to a point over the displayed medical image B which appears of interest to him. The presented movement of the white arrow 4 on the display unit 10 is almost simultaneous with the movement of the pointing appliance 11, i.e. without any noticeable time delay, on account of the system's processing speed for the signals which are to be processed. In this case, by way of example, the pointing appliance 11 produces navigation signals 11e and transmits them to the electronic data processing device 20, which for its part either converts them or forwards them directly to the display unit 10 for presentation. The same aspect may apply similarly to the other signals, which are described below. A point which is of interest to the doctor in the displayed medical image B is shown by the black dot (see FIGS. 2a to 2e), for example, which has the white arrow 4 located at its position.

By clicking, i.e. activating, an operator control element on the pointing appliance 11, such as a right-hand key 113, or operating a depressible scrollwheel 112 (see FIG. 3), the doctor activates the context menu 1 (see FIG. 2b) at 310 (see FIG. 1) by producing at least one activation signal 11a. The context menu 1 is then presented, i.e. displayed, on the display unit 10 and 320 (see FIG. 1). The presentation of the context menu 1 may have been triggered by means of at least one presentation signal 11b which is produced and/or converted by the navigation device 11 and/or by the electronic data processing device 20. The presentation signal 11b is transmitted to the display unit 10 for appropriate presentation.

The context menu 1 shown in FIGS. 2b to 2e have a square two-dimensional shape. Alternatively, the context menu 1 could also be presented as a three-dimensional cube which can be rotated about a center, as a cuboid or as a circular element, for example. Within the context menu 1, there are firstly the symbol-like functional elements 2a to 2f (presented as icon buttons or pictograms) and also the textual functional elements 3a to 3f (presented as terms or menu entries). In the context menus 1 displayed in FIGS. 2b to 2f, the button 2a is associated with the button 3a, etc. The arrangement of the buttons 2a to 2f and 3a to 3f is in rows in accordance with the outer, rectangular contour of the context menu 1. In addition, the connection of pictograms to terms, i.e. text, allows rapid recognition of the correct menu entry without having to read the text. This has an associated increased efficiency for the editing and control of the program by the user.

Alternatively, the context menu 1 could be presented as a rotatable two-dimensional disc on which the buttons 2a to 2f and 3a to 3f are situated around the periphery and turn accordingly whenever the disc is rotated.

The context menu 1 contained in FIGS. 2b to 2e is also at least partially nonobscuring, i.e. presented transparently, in respect of the presented medical image B. Only the buttons presented as pictograms 2a to 2f and as terms 3a to 3f are in full color, i.e. presented in covering form. As already mentioned, such transparent presentation of the context menu 1 can contribute to the doctor maintaining focus in the course of the process of analyzing the medical image B, since the context menu 1 does not obscure the displayed medical image B and hence the "underlying" structures or elements of the medical image B continue to be visible. A similar situation naturally also applies to other graphics applications whose tools and accessories are operated using the method according to an embodiment of the invention.

As already mentioned, each of these functional elements 2a to 2f and 3a to 3f can be selected as a button or menu entry in the context menu 1 by way of at least one selection signal 11c. This signal may likewise apply to the activation of a selected functional element or of a selected button. The selection signal 11c may therefore be identical to the activation signal 11a.

At least one activation signal 11a can be used firstly to activate a context menu 1 and/or to activate at least one functional element or at least one button 2a to 2f or 3a to 3f in the context menu 1.

The at least one activation signal 11a can be produced either by operating an operator control element 111, 112, 113 on the navigation device 11 or automatically by moving the navigation device 11 or the navigation symbol 4 over the medical image B. The automatic activation of the context menu 1 can take place on the basis of the position on the navigation symbol 4, i.e. of the white arrow 4, relative to a displayed region of the medical image B. In this case, the information in the medical image B is appropriately linked to the position, i.e. to the coordinates of the white arrow 4, which represents the position of the navigation device 11.

A currently selected functional element 2a to 2f or 3a to 3f is displayed or presented by an appropriate marker. In addition, a selected functional element 2a to 2f or 3a to 3f can be activated by way of at least one activation signal. Activation of a functional element 2a to 2f or 3a to 3f prompts a particular tool or a particular accessory of the image editing program to be started.

In the context menu 1 presented following the activation at 310 (see FIG. 1) and the display on the display unit 10 at 320 (see FIG. 1), the button identified by 2c or 3c is presented so as to be preselected by way of a frame. The activation of the button 2c and/or 3c by way of at least one activation signal 11c would result in the execution of the tool or accessory "tool 3" of the image editing program.

Which button is presented as preselected following the activation (at 310) of the context menu 1 at 320 may be dependent on a preset which needs to be made when the image editing program is started. This provides context-sensitive configurability. It goes without saying that this naturally also applies to other buttons in the context menu 1. Alternatively, the buttons in the context menu 1 can be displayed according to the frequency of their activation, i.e. use. This provides dynamic automatic configuration of the context menu 1. It is also possible not to make a preset, which means that no button is preselected.

It is also possible to present a particular number of buttons, i.e. the buttons 2a to 2c and 3a to 3c, in a fixed order relative to one another in a first region in the context menu 1 and to present a second region of the context menu 1 such that other buttons are dynamic and/or context-sensitive, i.e. it has changing buttons or selectable tools and accessories.

The presented context menu 1 with the buttons 2a to 2f and 3a to 3f it contains for the respective tools and accessories provided by the application can be deactivated, i.e. hidden again, by means of a deactivation signal 11d. The deactivation signal 11d can be produced by operating an operator control element on the navigation device 11. Alternatively, such a signal could also be produced by an operator control element 12a or 12b on a data input device 12, such as a keyboard. However, the context menu 1 can be deactivated or hidden automatically after a button 2, 3 and hence a corresponding tool have been activated.

Figure 2B:
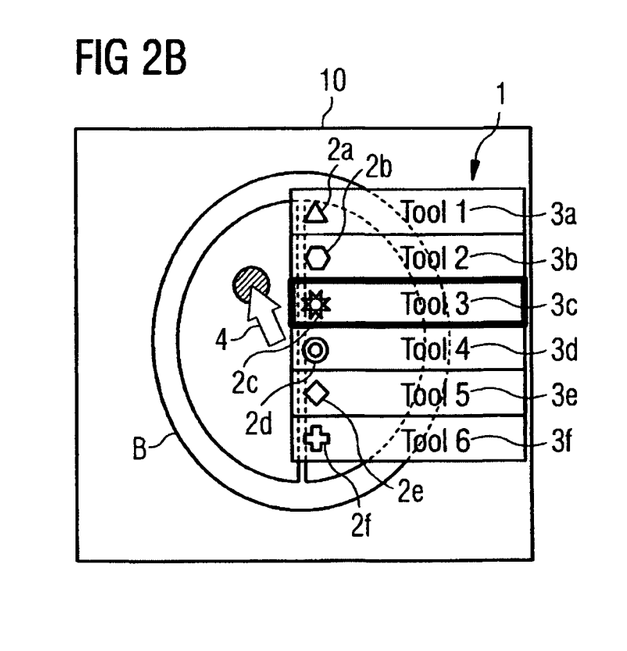
Figure 2C:
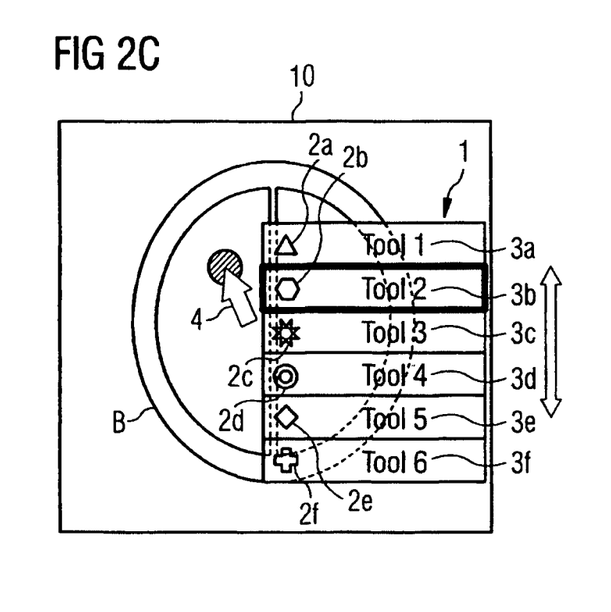
Figure 2D:
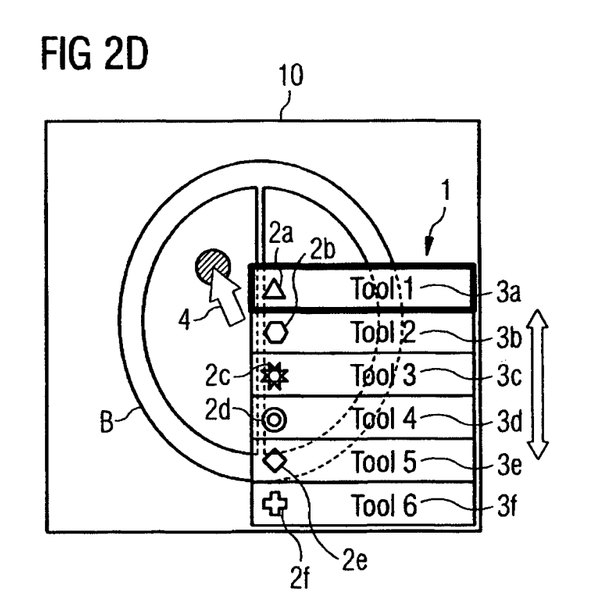

The further FIGS. 2c to 2d now describe the selection and presentation process for buttons 2, 3 at 330 (see FIG. 1) on the basis of the operation of an appropriate operator control element 112 on the navigation device 11.

The button preselected following the activation and presentation of the context menu 1 is associated with the tool "Tool 3". However, the user wishes to execute the tool "Tool 2". "Tool 2" is represented or activated by the buttons 2a and 3a. In this case, the selection process can now be performed using a specific operator control element 112 on the navigation device 11. The navigation device 11 comprises an appropriate selection, control and activation module, which is shown in FIG. 3 as a dashed rectangle identified by 114.

Figure 3:
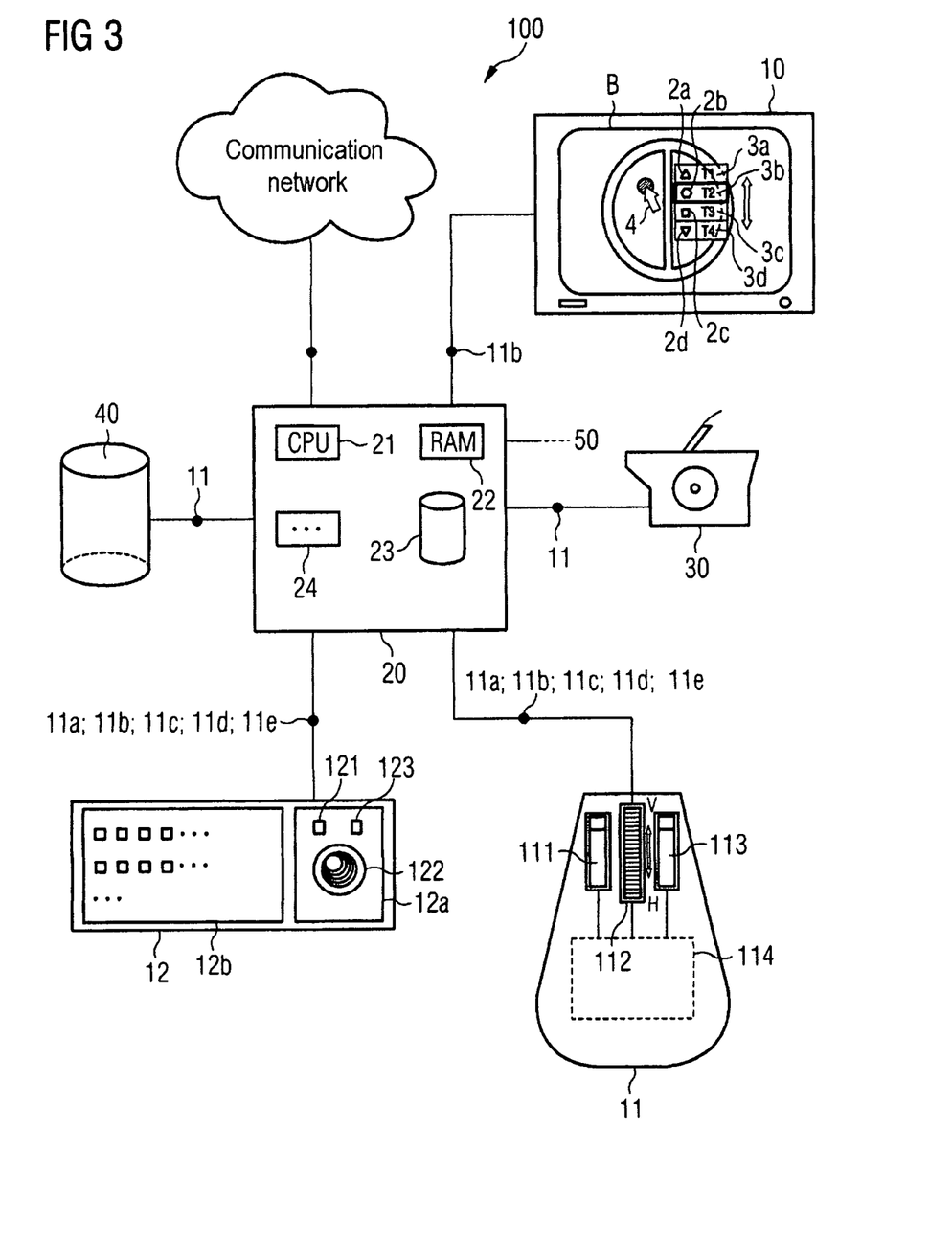
FIG. 3 shows a schematic illustration of an example of the system according to an embodiment of the invention for carrying out the method according to an embodiment of the invention.

As already mentioned a number of times, the navigation device 11 shown schematically in FIG. 3 is a mobile, i.e. displaceable, pointing appliance 11, for example a computer mouse 11. The computer mouse 11 comprises a left-hand key 111 for producing signals, a right-hand key 113 for producing signals and also what is known as a "jog dial" in the form of a depressible scrollwheel 112 for producing signals. In addition, the movement, i.e. displacement, of the computer mouse 11 can likewise produce signals, such as navigation signals 11e.

The operator control elements 111, 112, 113 are connected to the selection, control and activation module 114 in order to be able to appropriately convert and/or forward the signals they produce, which is described above.

The depressible scrollwheel 112 can rotate firstly in the direction V, i.e. forward, and in the direction H, i.e. backward. Rotating the scrollwheel 112 on the computer mouse 11 now produces movement by the context menu 1 on the display unit 10. The presented movement of the context menu 1 is now effected more or less without any noticeable time delay such that a currently selected button 2, 3 (as a result of rotation of the scrollwheel 112) is always at the same position as the button which was initially, i.e. following the activation and presentation of the context menu 1 on the display unit 10, presented as the button presented as selected.

In FIG. 2b, the button 2c or 3c from the tool "Tool 3" is presented as selected. Rotation of the scrollwheel 112 in the direction H now moves or presents movement of the context menu 1 on the display unit downward, so that the next button 2b or 3b for the tool "Tool 2" which is presented as selected is presented at the same point, i.e. at constant location, as the button 2c or 3c for the tool "Tool 3" which was previously presented as selected. This is shown in FIG. 2c and corresponds to section 330 in FIG. 1.

Further movement of the scrollwheel 112 (section 330) in the direction H, i.e. backward, and production of corresponding selection signals 11c results in further movement of the context menu 1, in this case downward, so that the button 2a or 3a for the tool "Tool 1" is moved to or presented in a relevant position. This can be seen from FIG. 2d.

In other words, the menu entries, i.e. buttons 2, 3, are selected not by moving the computer mouse 11 or the navigation symbol 4 presented as a white arrow 4 but rather by rotating the scrollwheel 112 on the computer mouse. The computer mouse 11 therefore does not need to be moved, i.e. displaced, in order to select the respective buttons 2, 3.

Alternatively, the presented position of the context menu 1 on the display unit 10 could be and remain at a constant location, with the buttons 2, 3 moving within the context menu on the basis of the rotation of the scrollwheel 112. Such display is similar to the display on an electricity meter, for example, in which the displayed numerical sequences correspond to the respectively selected buttons.

Figure 2E:
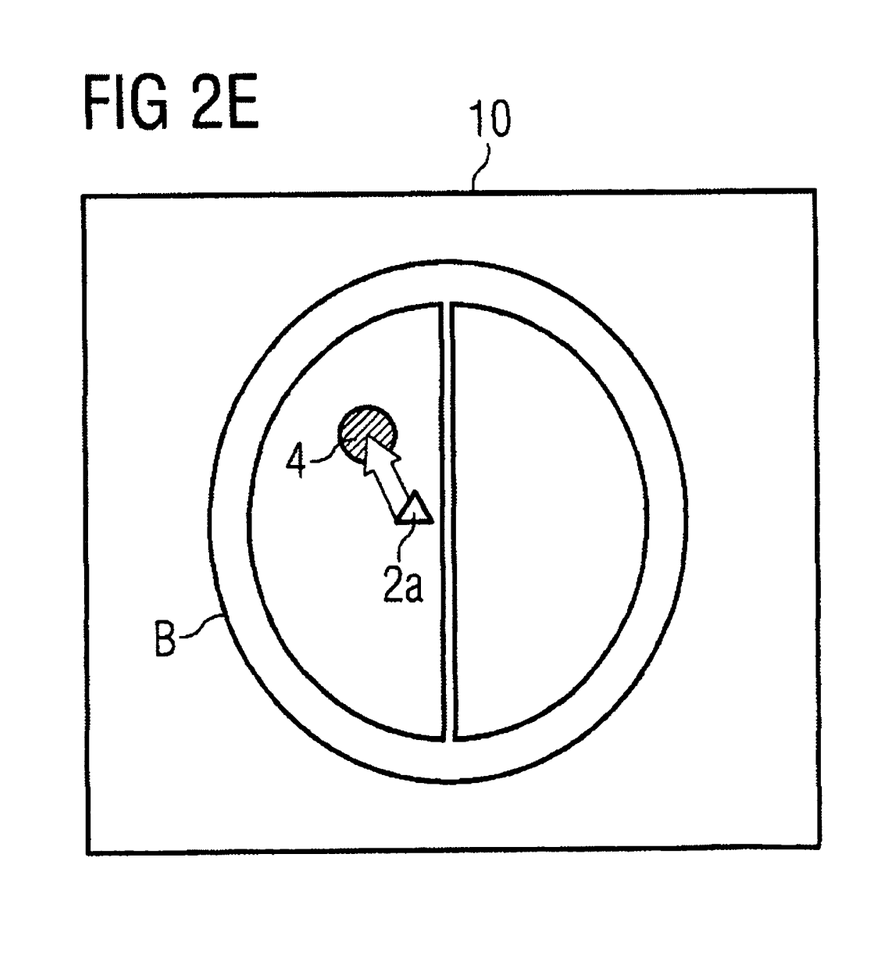

After the desired tool "Tool 1" is accordingly presented as the selected button 2a or 3a, it can then be activated by means of appropriate activation signals 11a by pressing the scrollwheel 112 or the left-hand or right-hand key 111, 113 on the computer mouse 11. FIG. 2e shows the display on the display unit 10 after the button 2a or 3a for "Tool 1" has been activated.

The scrolling of the scrollwheel 112 therefore means that the doctor's or user's regard remains at the point on which he is focused (in this case a region of the medical image B which is presented as a black dot and which also has the white arrow 4 or mouse pointer 4 presented at its position). The operation of the scrollwheel 112 on the computer mouse 11 prompts intrinsic movement in the context menu 1, while the context menu 1 itself is presented at another position on the screen. The relevant menu entry or the desired button 2, 3 moves into the field of vision of the doctor.

FIG. 3 schematically shows an example of a system 100 according to an embodiment of the invention. Besides the computer mouse 11 already described as a navigation device, the system 100 comprises the electronic data processing device 20 to which the computer mouse 11 is connected. In addition, a further data input device, but one remaining statically at one location, in the form of a keyboard 20 is shown with the electronic data processing device 20. Besides a region 12b with input keys for text, numbers, etc., the keyboard 20 comprises a static navigation device 12a with two keys 121, 123 and a track ball 122. A static navigation device 12a of this kind can likewise be used for carrying out the method according to an embodiment of the invention.

The electronic data processing device 20 comprises not only a CPU 21, a RAM 22 and an internal read-only memory 23 but also a module 24 for converting the signals described above for carrying out the method according to an embodiment of the invention.

The electronic data processing device 20 may be connected to a external database 40, to a printer 30, to further apparatuses 50 and/or to a communication network (Internet, Intranet, etc.).

The electronic data processing device 20 shown in FIG. 3 is likewise connected to a display unit 10. The display unit 10 may comprise a screen, such as a liquid crystal screen (LC display), a thin film transistor screen (TFT display), a plasma screen, a cathode ray tube screen, etc. Alternatively, the display unit may also comprise a projector, such as a video projector, a digital projector, etc.

Finally, it should be pointed out that the description of the invention and the example embodiments are to be understood, in principle, to be nonlimiting in respect of one particular physical implementation of an embodiment of the invention. In particular, it is obvious to a person skilled in the relevant art that the invention can be implemented partially or completely in software and/or hardware and/or in a manner distributed over a plurality of physical products—in this case particularly also computer program products.

Further, elements and/or features of different example embodiments may be combined with each other and/or substituted for each other within the scope of this disclosure and appended claims.

Still further, any one of the above-described and other example features of the present invention may be embodied in the form of an apparatus, method, system, computer program and computer program product. For example, of the aforementioned methods may be embodied in the form of a system or device, including, but not limited to, any of the structure for performing the methodology illustrated in the drawings.

Even further, any of the aforementioned methods may be embodied in the form of a program. The program may be stored on a computer readable media and is adapted to perform any one of the aforementioned methods when run on a computer device (a device including a processor). Thus, the storage medium or computer readable medium, is adapted to store information and is adapted to interact with a data processing facility or computer device to perform the method of any of the above mentioned embodiments.

The storage medium may be a built-in medium installed inside a computer device main body or a removable medium arranged so that it can be separated from the computer device main body. Examples of the built-in medium include, but are not limited to, rewriteable non-volatile memories, such as ROMs and flash memories, and hard disks. Examples of the removable medium include, but are not limited to, optical storage media such as CD-ROMs and DVDs; magneto-optical storage media, such as MOs; magnetism storage media, including but not limited to floppy disks (trademark), cassette tapes, and removable hard disks; media with a built-in rewriteable non-volatile memory, including but not limited to memory cards; and media with a built-in ROM, including but not limited to ROM cassettes; etc. Furthermore, various information regarding stored images, for example, property information, may be stored in any other form, or it may be provided in other ways.

Example embodiments being thus described, it will be obvious that the same may be varied in many ways. Such variations are not to be regarded as a departure from the spirit and scope of the present invention, and all such modifications as would be obvious to one skilled in the art are intended to be included within the scope of the following claims.

What is claimed is:

1. A method for generating and controlling an interaction object, which is presentable and movable on a display unit and includes a functional element for controlling tools, the functional element being at least one of selectable and activatable via a selection signal from an operator control element on a navigation device, the at least one operator control element is a jog dial, the navigation device being presented on the display unit by a movable navigation symbol, the method comprising:
presenting the interaction object via a presentation signal from the navigation device, the interaction object including a static and a dynamic region and configured for a medical application, the presenting the interaction objection including presenting the functional element within the interaction object in a context dependent fashion;
selecting the functional element from the presented interaction object by way of the selection signal such that the selection is made without a movement by the movable navigation symbol, and the selected functional element is presented at a constant location on the display unit at least one of by movement within the interaction object and by movement of the interaction object, wherein at least one of the static region and the dynamic region of the interaction object is configurable in a context sensitive and dynamic fashion and the interaction object presents the functional element as a symbol and textual elements.

2. The method as claimed in claim 1, further comprising:
activating the interaction object at least one of prior to the presentation of the interaction object and prior to the selection of the functional element, the activation being performed at least one of automatically and by way of an activation signal from the operator control element on the navigation device.

3. The method as claimed in claim 2, wherein the selection signal is identical to the activation signal.

4. The method as claimed in claim 2, wherein at least during the selection, at least one of the functional element to be selected and the selected functional element is presented in a position on the display unit which is at a constant location relative to a position of the navigation symbol when the interaction object is activated.

5. The method as claimed in claim 1, further comprising:
deactivating the interaction object via a deactivation signal.

6. The method as claimed in claim 2, further comprising:
deactivating the interaction object at least one of following selection and following the activation of the functional element.

7. The method as claimed in claim 1, wherein the interaction object is presented in nonobscuring fashion relative to a presented background on the display unit.

8. The method as claimed in claim 1, wherein the navigation symbol is presented following activation of the interaction object in a position whose location is constant on the display unit.

9. The method as claimed in claim 1, wherein the navigation device is in the form of a movable pointing appliance.

10. A navigation device comprising:
at least one operator control element; and
at least one selection and activation module for carrying out the method as claimed in claim 1.

11. A system for generating and controlling an interaction object for a graphical user interface, the interaction object being presentable and movable on a display unit and including at least one functional element for controlling tools, wherein the functional element is at least one of selectable and activatable via a selection signal from an operator control element on a navigation device, the at least one operator control element is a jog dial, and wherein the navigation device is presented on the display unit by at least one movable navigation symbol, the system comprising:
at least one navigation device including at least one operator control element to produce at least one of an activation signal, presentation signal, selection signal, deactivation signal and navigation signal;
an electronic data processing device including at least one module such that the at least one module is prompted by way of the presentation signal from the navigation device to present the interaction object, the interaction object including a static and a dynamic region and configured for a medical application, the presenting the interaction objection including presenting the functional element within the interaction object in a context dependent fashion, and the module is prompted by way of the selection signal to select the at least one functional element from the presented interaction object such that the selection is made without a movement by the at least one movable navigation symbol and that at least one of the at least one functional element to be selected and the selected at least one functional element is presented at a constant location on the display unit at least one of by moving within the interaction object and by moving the interaction object, wherein at least one of the static region and the dynamic region of the interaction object is configurable in a context sensitive and dynamic fashion and the interaction object presents the functional element as a symbol and textual elements.

12. A non-transitory computer readable medium including program segments for, when executed on a computer device, causing the computer device to implement the method of claim 1.

13. The method as claimed in claim 3, wherein at least during the selection, the selected functional element is presented in a position on the display unit which is at a constant location relative to a position of the navigation symbol when the interaction object is activated.

14. The method as claimed in claim 3, further comprising:
   deactivating the interaction object at least one of following selection and following the activation of the functional element.

15. The method as claimed in claim 1, wherein presentation of the interaction object involves the functional element being presented in context-dependent fashion at least one of on a basis of use and on a basis of the application of the tool.

* * * * *